United States Patent [19]

Satoh et al.

[11] Patent Number: 4,566,997

[45] Date of Patent: Jan. 28, 1986

[54] PROCESS FOR PREPARING RESIN METAL SALTS

[75] Inventors: Hisatake Satoh, Yokohama; Shinichi Ota, Tokyo, both of Japan

[73] Assignee: Nippon Oil Co.,Ltd., Tokyo-to, Japan

[21] Appl. No.: 570,525

[22] Filed: Jan. 13, 1984

[30] Foreign Application Priority Data

Jan. 17, 1983 [JP] Japan ................................. 58-5669

[51] Int. Cl.$^4$ ............................ C09F 9/00; C08F 4/00
[52] U.S. Cl. ................................ 260/105; 526/238.3; 526/327.4; 526/327.9; 526/329.7; 526/330.2; 526/331.9; 526/332.1; 527/600
[58] Field of Search ................... 260/105; 526/327.4, 526/327.9, 329.7, 330.2, 331.9, 332.1, 238.3; 527/600

[56] References Cited

U.S. PATENT DOCUMENTS

| 2,075,025 | 3/1937 | Dietz et al. | 260/105 |
| 2,287,116 | 6/1942 | Minich | 260/105 |
| 2,466,925 | 4/1949 | Brauner | 260/105 |
| 2,825,657 | 3/1958 | Mock et al. | 260/105 |

FOREIGN PATENT DOCUMENTS 8036 of 1884 United Kingdom ................ 260/105

*Primary Examiner*—Herbert S. Cockeram
*Attorney, Agent, or Firm*—Weingarten, Schurgin, Gagnebin & Hayes

[57] ABSTRACT

The process for preparing a resin metal salt involves reacting a resin containing a carboxyl group and/or an anhydride group in the state of a solution in a solvent with a hydroxide, oxide or carbonate of a divalent metal in the presence of ammonia or an amine. The resin metal salts so prepared are useful as binders in inks, paints, and adhesives.

6 Claims, No Drawings

PROCESS FOR PREPARING RESIN METAL SALTS

SUMMARY OF THE INVENTION

The present inventon relates to a process for preparing a resin metal salt of a pale color which comprises reacting a resin containing a carboxyl group and/or an anhydride group with a divalent metallic compound.

BACKGROUND OF THE INVENTION

It is known that petroleum resin and rosin metal salts are employed as resins for rotogravure inks and that petroleum resin metal salts are employed as resins for thermally fused road markings. They may also be used as resins for other paints and adhesives (Japanese Patent Publication Nos. 42-7,334 and 57-28,431).

The reaction of maleic anhydride-added petroleum resins with a divalent metal does not usually proceed in a state in which an oxide or a hydroxide of the metal is mixed with the maleated petroleum resin in a molten state at about 250° C. In this case, the presence of an acetate of the metal in the system can make the reaction proceed. This reaction, however, presents the disadvantage that an organic acid is rendered free. It is also known that rosin can be linkewise reacted with a hydroxide of a metal at about 250° C. to yield the corresponding rosin metal salt. However, these reactions, in which high temperatures are applied, present the drawbacks that thermal deterioration of the resin occurs, leading to a considerable debasement in resin hue. When such resins are used as rotogravure inks, the disadvantages are presented that the color tone is degraded and, when they are used for white paints, the paints will be tinged with yellow.

As a result of research on processes that may produce resin metal salts without causing any deterioration in the resin hue, it has been found that resin metal salts may be produced smoothly by reacting a resin in solution in an appropriate solvent with a hydroxide or oxide of a metal in the presence of a small amount of ammonia or an amine at low temperatures so that no thermal deterioration of the resin occurs. The present invention is based on this finding.

DETAILED DESCRIPTION OF THE INVENTION

The process according to the present invention allows a resin to react with a divalent metal with less deterioration in the resin hue so that resins which are appropriate for use as binders for paints, inks and adhesives are obtained.

The resins to be used for the present invention may include a natural or synthetic resin containing a carboxyl group and/or an anhydride group having an acid value ranging usually from 5 to 250. Representative examples of such resins may include maleated petroleum resin, rosin, maleated rosin, maleated DCPD resin, styrene-(meth)acrylic acid copolymer, maleated diolefin polymer and styrene-maleic anhydride copolymer. These resins preferably have a molecular weight ranging from 250 to 5,000.

The hydroxide, oxide or carbonate of the divalent metal is the hydroxide, oxide or carbonate of a metal that can be acted as divalent and such metals may include calcium, zinc, magnesium, barium, manganese and iron. Such metal compounds may include calcium hydroxide, magnesium hydroxide, zinc hydroxide, calcium oxide, zinc oxide, calcium carbonate, zinc carbonate and magnesium carbonate.

The amines to be used for the present invention may include amines having a carbon atom or atoms ranging from 1 to about 12 and include, for example, a primary amine such as methylamine, ethylamine or propylamine; a secondary amine such as dimethylamine, diethylamine or dibutylamine, a tertiary amine such as triethylamine; an alkanolamine such as monoethanolamine, diethanolamine or dimethylaminoethanol; or a cyclic amine such as morpholine or N-methylmorpholine.

The amount of the metal to be converted into the metal salt may range from 0.5 to 8% by weight based on the weight of the resin. The amount of the amine to be used may be from about 0.1 to 3 parts by weight per 100 parts by weight of the resin.

Reaction temperatures may be in the range from about 0° to 180° C., and preferably from about 15° to 150° C. Reaction periods may be in the range from about 0.5 to 5 1 hours.

The term "solvent" referred to in the present invention means one that can dissolve the resin to be used as a raw material and that is itself inert during the reaction. Such solvents may include an aliphatic or aromatic hydrocarbon such as hexane, heptane, benzene, toluene or xylene or a hydroxyl group-containing compound such as ethanol, IPA, butanol, ethylene glycol, monoethyl- or butyl-ether.

The present invention will be described in more detail by way of working examples.

REFERENCE EXAMPLE 1

To 100 parts of an aromatic hydrocarbon resin ("Neopolymer 140", softening point 143° C., Nippon Petrochemicals Co., Ltd.) in a molten state at 200° C. were added 6 parts of maleic anhydride. The mixture was then reacted for 5 hours to yield a resin having a softening point of 151° C., a hue of 5, and an acid value of 32.

It is to be noted that the hue has been determined according to ASTMD-1544-58T by dissolving 2 g of the resin in 20 ml of benzene.

EXAMPLES 1 to 3

To a solution of 50 parts of the maleic anhydride-added resin of Reference Example 1 in 50 parts of toluene were added 1.5 parts of zinc hydroxide and 0.3 part of an amine, and the mixture was stirred at about 110° C. for 1 hour while the water formed during the reaction was removed. After the reaction was over, the reaction mixture was filtered and then distilled to remove the toluene to yield a resin metal salt. It was found that this resin was useful as a resin for rotogravure inks.

COMPARATIVE EXAMPLE 1

The procedures of Example 1 were followed with the exception that no amine was employed. It was found that a resin metal salt was hardly formed.

COMPARATIVE EXAMPLE 2

To 50 parts of the maleated resin of Reference Example 1 in a molten state at 250° C. were added 1.5 parts of zinc hydroxide, and the mixture was stirred for 2 hours. In this case, little metal salt was formed and considerable deterioration of the resin hue occurred.

REFERENCE EXAMPLE 2

A four-necked flask equipped with a stirrer, a thermometer and a reflux condenser was charged with 50 parts of butyl "Cellosolve", and the mixture was heated to 170° C. A monomer mixture consisting of 80 parts of styrene, 20 parts of methacrylic acid, 2 parts of di-tert.-butyl peroxide and 50 parts of butyl "Cellosolve" was dropwise added thereto over a period of 1 hour. After completion of the dropwise addition, the mixture was then stirred for 1 hour, and the unreacted monomers and the solvent were distilled off to yield a resin having a softening point of 122° C. and an acid value of 114.

EXAMPLES 4 AND 5

The resin obtained in Reference Example 2 was dissolved in isopropyl alcohol to give a 50% by weight solution. To this solution were added 3 g of calcium hydroxide and 0.5 g of an amine, and the mixture was allowed to react at about 145° C. in the same manner as in Example 1. After completion of the reaction, the xylene was distilled off to yield a resin metal salt.

COMPARATIVE EXAMPLE 3

The procedures of Example 4 were followed with the exception that no amine was employed. It was found that this example formed little metal salt.

COMPARATIVE EXAMPLE 4

To 50 parts of the resin obtained in Reference Example 2 in a molten state at 250° C. were added 3 parts of calcium hydroxide, and the mixture was allowed to react for 3 hours. After the reaction was over, the reaction mixture was dissolved in xylene and then the unreacted calcium hydroxide was filtered off. Then the xylene was distilled off to give a resin metal salt.

The thus-obtained resin was found to be poorer in softening point and hue than the resins of Examples 4 and 5.

TABLE 1

|  | Example 1 | Example 2 | Example 3 | Comparative Example 1 | Comparative Example 2 |
|---|---|---|---|---|---|
| Type of amine | morpholine | monoethanol amine | triethylamine | none | none |
| Softening point of resin (°C.) | 168 | 171 | 167 | 151 | 151 |
| Hue of resin (Gardler) | 7 | 7 | 7 | 6 | 12 |
| Acid value (mg KOH/g) | 22 | 20 | 22 | 32 | 32 |
| Amount of zinc (wt %) (Note 1) | 1.7 | 1.8 | 1.7 | ≈0 | ≈0 |

(Note 1) Measured according to atomic-absorption spectroscopy

TABLE 2

|  | Example 4 | Example 5 | Comparative Example 3 | Comparative Example 4 |
|---|---|---|---|---|
| Type of amine | di-butyl-amine | dimethyl-amino-ethanol | none | none |
| Softening point of resin (°C.) | 148 | 151 | 122 | 142 |
| Hue of resin (Gardler) | 2 | 2 | 1 | 6 |
| Acid value (mg KOH/g) | 76 | 70 | 114 | 81 |

What is claimed is:

1. A process for preparing a resin metal salt characterized in that a resin containing an anhydride group and having a molecular weight ranging from 250 to 5000 in a state of a solution in a solvent is reacted with a hydroxide, oxide, or carbonate of a divalent metal in the presence of ammonia or an amine.

2. The process according to claim 1, wherein said resin has an acid value ranging from 5 to 250.

3. The process according to claim 1, wherein said divalent metal is in an amount ranging from 0.5 to 8% by weight of the resin.

4. The process according to claim 1, wherein an amount of said amine is in a range from 0.1 to 3 parts by weight based on 100 parts by weight of the resin.

5. The process according to claim 1, wherein the reaction is carried out at a temperature from 0° to 180° C.

6. The process according to claim 1, wherein the reaction is carried out at a temperature from 15° to 150° C.

* * * * *